United States Patent [19]

Eiermann

[11] Patent Number: 5,199,863
[45] Date of Patent: Apr. 6, 1993

[54] SEALING OF AN ECCENTRIC BEARING OF A ROTARY PISTON INTERNAL COMBUSTION ENGINE

[75] Inventor: Dankwart Eiermann, Weissensberg, Fed. Rep. of Germany

[73] Assignee: Wankel GmbH, Berlin

[21] Appl. No.: 525,476

[22] Filed: May 18, 1990

[30] Foreign Application Priority Data

Feb. 7, 1990 [DE] Fed. Rep. of Germany ....... 4003663

[51] Int. Cl.⁵ .................... F01C 19/06; F01C 19/12
[52] U.S. Cl. .................................. 418/61.2; 418/91; 418/94; 418/144
[58] Field of Search ............... 418/61.2, 91, 94, 142, 418/144

[56] References Cited

U.S. PATENT DOCUMENTS

| | | | |
|---|---|---|---|
| 3,213,801 | 10/1965 | Venygr | 418/94 |
| 3,289,651 | 12/1966 | Jinno | 418/61.2 |
| 3,333,763 | 8/1967 | Jungbluth | 418/91 |
| 4,850,827 | 7/1989 | Eiermann | 418/94 |

FOREIGN PATENT DOCUMENTS

| | | | |
|---|---|---|---|
| 1576900 | 5/1970 | Fed. Rep. of Germany | 418/91 |
| 220888 | 9/1968 | U.S.S.R. | 418/91 |
| 1134899 | 11/1968 | United Kingdom | 418/61.2 |

Primary Examiner—Leonard E. Smith
Assistant Examiner—D. L. Cavanaugh
Attorney, Agent, or Firm—Robert W. Becker & Associates

[57] ABSTRACT

A rotary piston internal combustion engine of trochoidal type of construction with a piston slidably journalled and controlled via a synchronous transmission gear drive unit. An eccentric bearing of the piston is sealed-off on both sides of the remaining machine chambers or spaces with sealing rings located around the eccentric shaft. Circulation of the lubricating oil and cooling oil that is under pressure being delimited as to this bearing and the cooling hollow chambers of the piston with such lubricating oil and cooling oil being kept away from the working chambers and also eliminating any oil inner seals otherwise required therewith.

6 Claims, 1 Drawing Sheet

SEALING OF AN ECCENTRIC BEARING OF A ROTARY PISTON INTERNAL COMBUSTION ENGINE

BACKGROUND OF THE INVENTION

1. Field of the Invention

The present invention relates to a rotary piston internal combustion engine having an oil-cooled piston slidably journalled and having a housing which consists of two side parts and a casing mantle part with dual-arc trochoidal-shaped casing mantle runway inner surfacing and having an eccentric shaft journalled in the side parts passing axially through the housing. The triangular piston mounted on the eccentric of the eccentric shaft rotates as controlled and regulated by a synchronous transmission gear drive unit which is provided in the piston between the eccentric and one of the side parts. The synchronous transmission gear drive unit is formed by a hollow gear stationary as secured on the piston and a pinion stationary as secured on the housing located around the eccentric shaft.

2. Description of the Prior Art

Conventionally the lubricating- and cooling-oil with such machines is supplied via axial and radial bores in the shaft into the slide bearing of the eccentric and from there into the cooling hollow chambers of the piston as well as directly into the transmission gear drive unit and to the outer side of the piston. Both the bearing lubrication as well as the cooling of the piston require a very considerable through-passage or volume of oil that is under pressure, which penetrates between the piston- and housing-sidewalls and there having to be kept away from working chambers and the combustion procedures by oil inner seals which are so-called scraper rings, in order not to cause any intolerable exhaust or waste gas values. The oil inner seals however are costly and complex and moreover not reliable. Furthermore the oil inner seals require structural space between the hollow gear of the transmission gear drive unit and the axial gas seals and accordingly restrict and narrow space available for other constructive possibilities.

SUMMARY OF THE INVENTION

An object of the present invention is to provide a circulation of oil that is under pressure for lubrication of the sliding bearing means and for cooling of the piston with such oil being kept away from the intermediate spaces between the housing sidewalls and the piston as well as being kept away from the gas seals of the piston.

BRIEF DESCRIPTION OF THE DRAWING

This object, and other objects and advantages of the present invention, will appear more clearly from the following specification in conjunction with the accompanying drawing, in which.

DESCRIPTION OF PREFERRED EMBODIMENT

Figure 1:
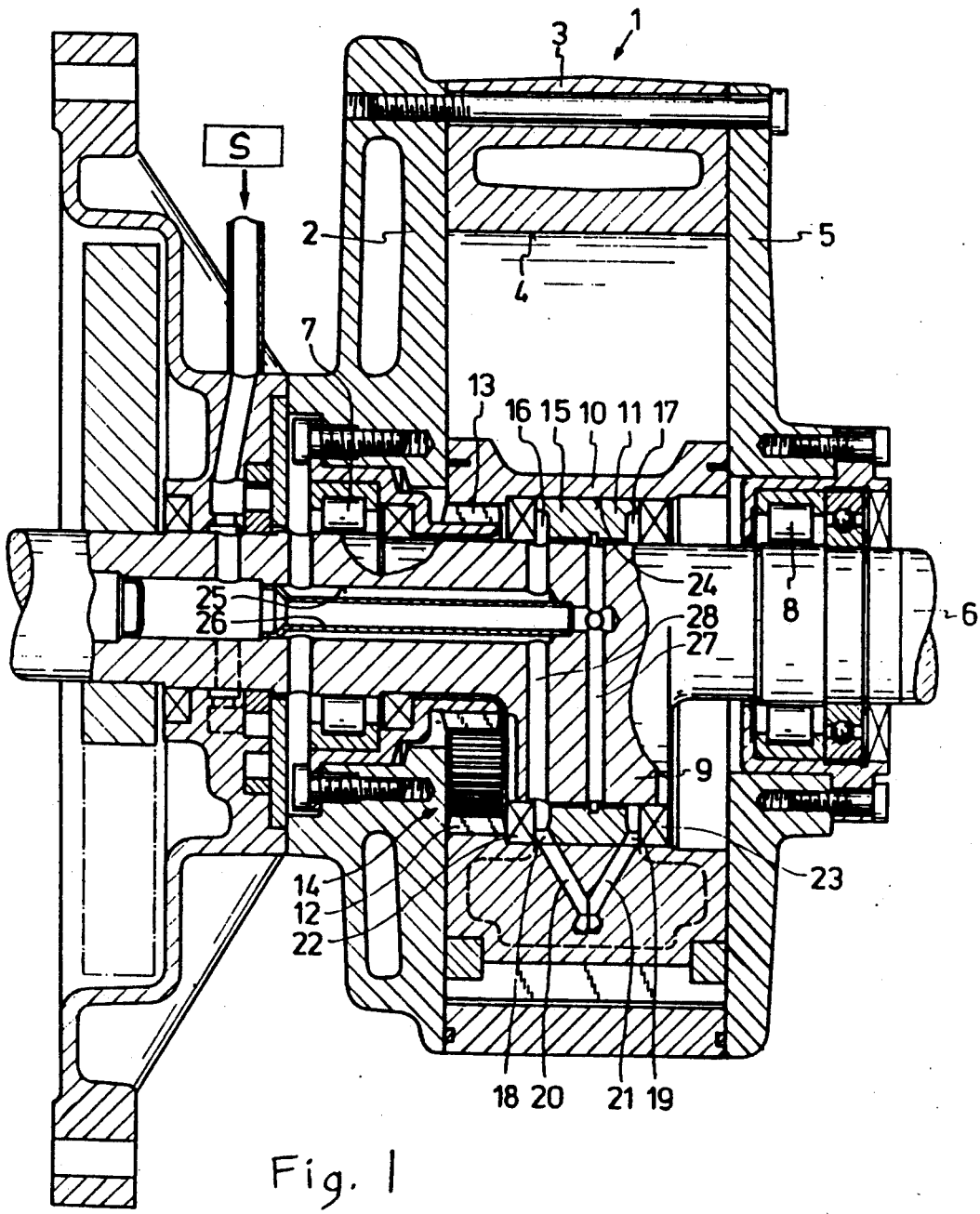
FIG. 1 is a view that shows an axial section through a rotary piston internal combustion engine having features in accordance with the present invention.

Referring now to the drawing in detail, the view of the drawing shows an axial section in a vertical plane located in an axis of the eccentric shaft. The housing 1 of this machine or engine consists of a left side part 2, the casing or mantle part 3 with a dual-arc trochoidal-shaped casing mantle runway inner surfacing 4 and a right side part 5. The eccentric shaft 6 is journalled by bearings 7 and 8 in the side parts 2 and 5. A triangular piston 10 runs upon an eccentric 9 of the eccentric shaft upon an eccentric bearing 11 embodied as a slide bearing and having a planetary-formed movement therewith. A synchronous transmission gear drive unit 14 is provided on the left side of the piston 10 and this drive unit 14 consists of a hollow gear 12 secured stationary on the piston 10 as well as a pinion 13 securely connected with a sidewall 2 of the housing 1 and located around the eccentric shaft 6.

The eccentric bearing 11 has a bearing body 15 made of a slide bearing alloy in which on both sides on axially inner edges thereof there are provided recesses or turned-out portions 16–17 into which axial bores 18, 19 lead, which are aligned and oriented with bores 20, 21 in the piston 10. These bores 18, 19 and 20, 21 can be arranged in a multiplicity, whereby the bores 20, 21 are connected with each other in the periphery of the piston 10 and having cooling oil discharging from the eccentric bearing flowing therethrough. In place of the bores 20, 21 there can be provided conventional cooling hollow chambers of the piston 10 as indicated by broken or dash lines in the drawing in the lower piston part.

Sealing rings 22, 23 of elastomeric oil-resistant sliding material are provided beside the recesses or turned-out portions 16, 17 in the bearing body; these sealing rings 22, 23 engage securely in the bearing bore 24 of the piston 10 and slide on the eccentric 9 and seal-off the oil circulation via the eccentric bearing 11 and piston 10 relative to the remaining spaces or chambers of the housing 1.

The circulation of the cooling oil and lubricating oil that is under pressure comes from a supply means S via a conduit and passages in communication with a pipe or tube 26 inserted or installed in an axial bore 25 in the eccentric shaft 6, which opens into radial bores 27 in the eccentric 9, which lead into the eccentric bearing 11. The oil discharging laterally from the eccentric bearing 11 from the right recess or turned-out portion 17 and the bores 19 in the bearing body 15 into the bores 21 and 20 or the cooling hollow chambers of the piston 10 and the oil is conveyed and from there comes via the bores 18 into the left recess or turned-out portion 16 and from there proceeds via the radial bores 28 in the eccentric 9 into the annular chamber or space around the pipe or tube 26 in the eccentric shaft 6. The oil circulation is closed via an oil pump and conventional feed and discharge or withdrawal means from and to the eccentric shaft.

The pressurized oil required with these features for the bearing lubrication and piston cooling can be kept secure by the gas seals of the working chambers and being kept away from these themselves so that oil inner seals can be eliminated. The lubrication of these gas seals as well as the synchronous transmission gear drive unit 14 requires only very small or nominal oil quantities or volume, which would be consumed thereby and consequently would reach only in negligible residues into the working chambers. This lubrication occurs via a supply means for dosage oil or lubrication.

In conclusion, the rotary piston internal combustion engine of the present disclosure has an oil cooled piston slidably journalled by bearings and also has a housing which consists of two side parts and a casing mantle part with dual-arc trochoidal-shaped casing mantle runway inner surfacing and having an eccentric shaft journalled in the side parts and passing axially through the housing. A triangular piston rotates upon an eccentric of the eccentric shaft as controlled by a synchronous transmission gear drive unit which is provided in the piston between the eccentric and one of the side parts. The synchronous transmission gear drive unit is formed by a hollow gear that is stationary or fixed to the piston and a pinion that is stationary or fixed on the housing and located around the eccentric shaft. The bearing body 15 of the eccentric bearing 11 on both sides thereof on axially inner edges has recesses or turned-out portions 16, 17, which are limited radially by the bearing surface of the eccentric 9 and limited axially laterally by sealing rings 23, 24, which engage securely against the bearing bore 24 of the piston 10 and slide on the eccentric 9; these recesses or turned-out portions 16, 17 have axial bores 18, 19 in the bearing body 15 opening therein and these bores 18, 19 are aligned with the bores 20, 21 in the piston 10. The bearing body 15 is made of any suitable slide bearing alloy of composite material with anti-seizure property. Pressurized oil circulation serving for lubrication of the eccentric bearing body 15 is restricted or limited to this eccentric bearing and the remaining machine parts running against each other are lubricated with a minimum quantity of oil or lubricant. Supply of oil or lubricant for remaining machine parts can occur in any manner, for example, via the main bearing 8 particularly at a location not shown in the cross-sectional drawing illustration. Complex and costly oil inner seals along the piston side walls are eliminated which is advantageous particularly since space would not be available to accommodate such eliminated seals.

Cooling hollow chambers are provided in the piston 10 and the bores 21 lead to these cooling hollow chambers for supplying of the cooling oil thereto and the cooling oil is discharged therefrom via the bores 20.

A supply means S for dosing the oil is provided for the eccentric bearing spaced from the synchronous transmission gear drive unit 14 and the gas seals of the piston.

The present invention is, of course, in no way restricted to the specific disclosure of the specification and drawing, but also encompasses any modifications within the scope of the appended claims.

What I claim is:

1. A rotary piston internal combustion engine having an oil-cooled piston journalled by slide bearings and a housing, which consists of two side parts and a casing mantle part with dual-arc trochoidal-shaped casing mantle runway inner surfacing and having an eccentric shaft journalled in the side parts passing axially through the housing, a triangular piston journalled upon an eccentric of the eccentric shaft and rotating controlled by a synchronous transmission gear drive unit which is provided in the piston between the eccentric and one of the side parts, said synchronous transmission gear drive unit being formed by a hollow gear secured stationary on the piston and a pinion secured stationary on the housing located around the eccentric shaft, the improvement comprising:

bearing body means provided adjoining sealing rings arranged in location axially for sealing of an eccentric bearing on both sides thereof having turned-out recesses along axially inner edges thereof, said recesses being delimited radially by a bearing surface of the eccentric and being delimited axially laterally by sealing rings of elastomeric oil-resistant sliding material provided beside the turned-out recesses in the bearing body means, which engage securely against a bearing bore of the piston and sliding on the eccentric, and axial bore means in the bearing body means opening into said recesses and which are aligned with additional bores in the piston.

2. A rotary piston internal combustion engine according to claim 1, in which cooling hollow chamber means are provided in the piston relative to which said additional bores lead for supply of cooling oil and from which the cooling oil is discharged via said additional bores.

3. A rotary piston internal combustion engine according to claim 1, in which a supply means dosing the oil is provided the eccentric bearing spaced from the synchronous transmission gear drive unit and the seals of the piston.

4. A rotary piston internal combustion engine according to claim 1, in which said bearing body means is made of said bearing alloy of composite material with anti-seizure property.

5. A rotary piston internal combustion engine according to claim 1, in which said eccentric bearing is a slide bearing and having a planetary-formed movement therewith.

6. A rotary piston internal combustion engine according to claim 1, in which said sealing rings engage securely in a bearing bore of the piston and slide on the eccentric and seal-off oil circulation via the eccentric bearing and piston relative to remaining spaces and chambers of the housing.

* * * * *